United States Patent
Han et al.

(10) Patent No.: US 10,452,405 B2
(45) Date of Patent: Oct. 22, 2019

(54) METHOD AND APPARATUS FOR ACCELERATING LOADING OF MOBILE APPLICATION CONTENT

(71) Applicant: KOREA ADVANCED INSTITUTE OF SCIENCE AND TECHNOLOGY, Daejeon (KR)

(72) Inventors: Dongsu Han, Daejeon (KR); Byung kwon Choi, Daejeon (KR); Jeong min Kim, Daejeon (KR)

(73) Assignee: KOREA ADVANCED INSTITUTE OF SCIENCE AND TECHNOLOGY, Yuseong-gu, Daejeon (KR)

(*) Notice: Subject to any disclaimer, the term of this patent is extended or adjusted under 35 U.S.C. 154(b) by 88 days.

(21) Appl. No.: 15/628,884

(22) Filed: Jun. 21, 2017

(65) Prior Publication Data
US 2018/0181409 A1 Jun. 28, 2018

(30) Foreign Application Priority Data
Dec. 27, 2016 (KR) .................. 10-2016-0180192

(51) Int. Cl.
*G06F 9/445* (2018.01)
*H04L 29/08* (2006.01)
*H04L 29/06* (2006.01)

(52) U.S. Cl.
CPC .............. *G06F 9/445* (2013.01); *H04L 67/28* (2013.01); *H04L 67/2842* (2013.01); *H04L 67/42* (2013.01)

(58) Field of Classification Search
CPC ......... G06F 9/445; G06F 16/95; H04L 67/28; H04L 67/2842; H04L 67/42; H04L 67/2847; H04L 67/04; H04L 67/26; H04L 67/02; H04L 67/2861; H04L 67/22; H04L 67/325; H04L 29/0881; H04L 29/08837
See application file for complete search history.

(56) References Cited

U.S. PATENT DOCUMENTS

| | | | |
|---|---|---|---|
| 2006/0212524 A1* | 9/2006 | Wu | H04L 67/1095 709/206 |
| 2007/0078734 A1* | 4/2007 | Oren | G06Q 20/102 705/26.1 |
| 2012/0198075 A1* | 8/2012 | Crowe | H04L 67/2847 709/226 |
| 2013/0018978 A1* | 1/2013 | Crowe | H04L 67/2842 709/214 |
| 2013/0111433 A1* | 5/2013 | Zhou | G06F 9/44 717/106 |
| 2014/0109072 A1* | 4/2014 | Lang | G06F 8/52 717/168 |
| 2015/0012608 A1* | 1/2015 | Ishikawa | H04L 67/28 709/213 |

(Continued)

FOREIGN PATENT DOCUMENTS

| | | |
|---|---|---|
| JP | 2010-231798 A | 10/2010 |
| KR | 10-2010-0022920 A | 3/2010 |
| KR | 10-2015-0003550 A | 1/2015 |

*Primary Examiner* — Alina A Boutah
(74) *Attorney, Agent, or Firm* — Sughrue Mion, PLLC (57) ABSTRACT

The present disclosure in some embodiments provides a method and an apparatus for accelerated loading of mobile application content which are capable of automatically discover opportunities for application acceleration to remarkably reduce a response time of a mobile application.

13 Claims, 10 Drawing Sheets

(56) References Cited

U.S. PATENT DOCUMENTS

| | | | | |
|---|---|---|---|---|
| 2015/0055594 A1* | 2/2015 | Nirantar | ............... | H04W 76/25 |
| | | | | 370/329 |
| 2015/0120821 A1* | 4/2015 | Bendell | ............... | G06F 16/957 |
| | | | | 709/203 |
| 2015/0201033 A1* | 7/2015 | Gupta | ............... | H04L 67/2842 |
| | | | | 709/213 |
| 2015/0256641 A1* | 9/2015 | Agarwal | ............... | G06F 16/95 |
| | | | | 709/203 |
| 2015/0319252 A1* | 11/2015 | Momchilov | .......... | H04L 67/141 |
| | | | | 709/223 |
| 2016/0191650 A1* | 6/2016 | Rong | ................... | H04L 67/306 |
| | | | | 709/213 |
| 2017/0346876 A1* | 11/2017 | Lim | .................... | G06F 16/9574 |
| 2018/0287960 A1* | 10/2018 | Huang | ................... | H04L 47/82 |

* cited by examiner

```
{ "id" : "/cps/news/world-australia-36240528",
  "type" : "bbc.mobile.news.item",
  "format" : "bbc.mobile.news.format.textual",
  "language" : "en-gb",
  "name" : "Poll date for Australia election officially confirmed",
  "relations" : [ {
    "primaryType" : "bbc.mobile.news.image",
    "secondaryType" : "bbc.mobile.news.placement.index",
    "content" : {
      "id" : "/cpsprodpb/4A9F/production/_89630191_turnbull.jpg",
      "type" : "bbc.mobile.news.image",
      "width" : 976,
      "height" : 549,   ... (The rest is omitted)
```

Image URL (pointing to the "id" line above)

METHOD AND APPARATUS FOR ACCELERATING LOADING OF MOBILE APPLICATION CONTENT

CROSS-REFERENCE TO RELATED APPLICATIONS

The present application is based on, and claims priority from, Korean Patent Application No. 10-2016-0180192, filed Dec. 27, 2016, the disclosure of which is incorporated by reference herein in its entirety.

STATEMENT REGARDING SPONSORED RESEARCH OR DEVELOPMENT

This work was supported in part in Republic of Korea by the Ministry of Science, ICT & Future Planning (MSIP), (grant numbers: B0126-16-1078 and R-20160222-002755), supervised by the Institute for Information & Communications Technology Promotion (IITP).

TECHNICAL FIELD

The present disclosure in at least some embodiments relates to a method and an apparatus for accelerating loading of mobile application content.

BACKGROUND

The statements in this section merely provide background information related to the present disclosure and do not necessarily constitute prior art.

According to the 2015 U.S. Mobile Application Report, mobile data traffic took up 56 percent of the entire internet traffic in 2015, and 40% to 50% of the mobile data traffic were generated by Android® applications (also known as apps). Furthermore, more than 1.5 million Android® applications are provided through Google's open market platform, and tens of thousands new apps are added monthly. This means that a lot of users are currently using Android® applications, and more developers are going to publish new Android® applications.

It is essential to minimize a response time for mobile applications to maximize a mobile application developers' profit and to satisfy mobile application users.

Approaches to acceleration of mobile applications such as transmission control protocol (TCP) acceleration, speedy networking protocol (SPDY), data compression, etc. are not satisfactory because such approaches cannot support application-specific characteristics.

One of the approaches to solve out such issues is to employ an application-specific proxy which is dedicated to each application. The application-specific proxy uses an application-specific protocol which is dedicated to a corresponding application to activate dynamic caching and dynamic prefetching. However, there are many difficulties in using such approaches. For example, developing an application-specific proxy code is time consuming and tedious.

Therefore, there is a need for a method and an apparatus capable of accelerating loading of mobile application content without consuming too much time.

SUMMARY

In accordance with some embodiments of the present disclosure, a method for accelerating loading of mobile application content by using a proxy, the method comprising: receiving at least one mobile application as an input; analyzing said at least one mobile application by using the input; generating an application-specific proxy dedicated to said at least one mobile application by using results from analyzing said at least one mobile application; generating prefetching content by prefetching content which is likely to correspond to a user's request by using the application-specific proxy; and transmitting the content to the user in response to the user's request.

In accordance with another embodiment of the present disclosure, an apparatus for accelerating loading of mobile application content by using a proxy, comprising: an automatic application-specific proxy generator for receiving application binary information to analyze the application binary information and to calculate acceleration features that are suitable for an application; and a proxy including: a content prefetching module for prefetching content which is likely to correspond to a request signal from a server before the request signal arrives; and a data comparison module to compare first content which is prefetched by the content prefetching module with second content corresponding to the request signal if the first content is identical to the second content; and a data transmission/reception unit to transmit the first content to a user terminal.

REFERENCE NUMERALS

100: apparatus for accelerated loading of mobile application content
110: automatic proxy generator   120: proxy
312: data collection unit   314: data analysis unit
316: acceleration opportunity identification unit -continued

| | |
|---|---|
| 318: code generation unit | 320: Android ® application |
| 510: data transmission/reception unit | 520: prefetching unit |
| 530: data storage unit | 540: prefetching determination unit |
| 550: data comparison unit | |

DETAILED DESCRIPTION

The present disclosure in some embodiments provides a method and an apparatus for accelerating loading of mobile application content by utilizing an automatic protocol analysis for automatically discovering opportunities for mobile application acceleration.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, a, b, i), ii), etc., are used solely for the purpose of differentiating one component from the other but not to imply or suggest the substances, order or sequence of the components. Throughout this specification, when a part "includes" or "comprises" a component, the part is meant to further include other components, not excluding thereof unless there is a particular description contrary thereto.

Exemplary embodiments of the present disclosure are described below with reference to the accompanying drawings.

Figure 1:
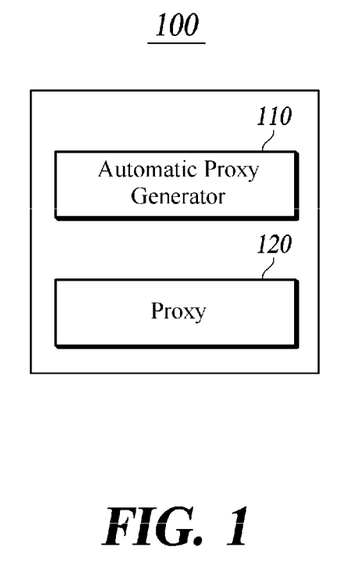
FIG. 1 is a schematic diagram of an apparatus for accelerating loading of mobile application content, according to at least one embodiment of the present disclosure.

FIG. 1 is a schematic diagram of an apparatus for accelerating loading of mobile application content, according to at least one embodiment of the present disclosure.

An apparatus 100 for accelerating loading of mobile application content, according to at least one embodiment of the present disclosure may be implemented by using software so that it can be installed in a mobile terminal, desktop PC, etc. Furthermore, the apparatus 100 may be implemented in an independent module capable of performing acceleration of loading.

The apparatus 100 for accelerated loading of mobile application content includes an automatic proxy generator 110 and a mobile application-specific proxy (120, hereinafter referred to as 'proxy').

The automatic proxy generator 110 receives a mobile application binary as an input value to generate a mobile application-specific proxy which is a proxy dedicated to a certain mobile application to reduce a response time of the mobile application. The automatic proxy generator 110 analyzes the received mobile application binary, identifies the type of the traffic generated by the mobile application and stores it as regular expressions (hereinafter referred to as the 'regex'). Hereinafter, a regular expression can also be referred to a 'regular expression signature'.

The automatic proxy generator 110 automatically generates a proxy 120 which is capable of accelerating loading of corresponding mobile application content by inputting regex signatures into a proxy which was already generated.

The proxy 120 prefetches content that is likely to be requested by a user while monitoring the traffic of the user. The proxy 120 transmits a user-requested on behalf of a server when the user sends a request for the content prefetched by the proxy 120. The proxy 120 is faster in transmitting the content than the server since the proxy 120 operates at a mobile edge cloud.

The operation of the apparatus 100 for accelerating loading of mobile application content can be described by using the automatic proxy generator 110 and the proxy 120 as follows.

Figure 2:
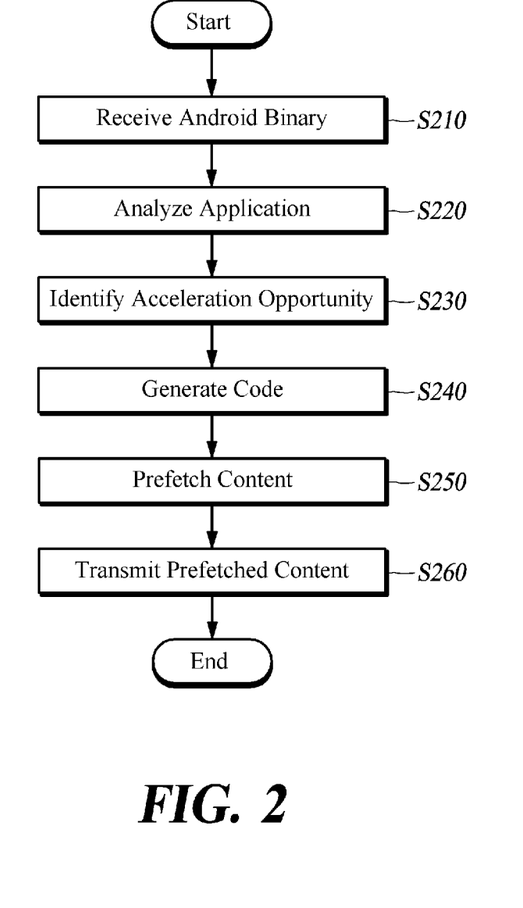
FIG. 2 is a flowchart of a method of accelerating loading of mobile application content, according to at least one embodiment of the present disclosure.

FIG. 2 is a flowchart of a method of accelerating loading of a mobile application content, according to at least one embodiment of the present disclosure.

The automatic proxy generator 110 receives Android® binary information which is one of the mobile application information as an input value (Step S210), and analyzes the received information (Step S220). The automatic proxy generator 110 identifies opportunities for acceleration to reduce the response time of the mobile application by using the analysis results (Step S230). The automatic proxy generator 110 generates a proxy code based on the analysis results and the identified opportunities for acceleration (Step S240). The proxy generated by the automatic proxy generator 110 prefetches content which is likely to be requested by a user (Step S250), and transmits the prefetched content to the user (Step S260).

The functional modules of the automatic proxy generator 110 are described for the purpose of illustration of its operation principle.

Figure 3:
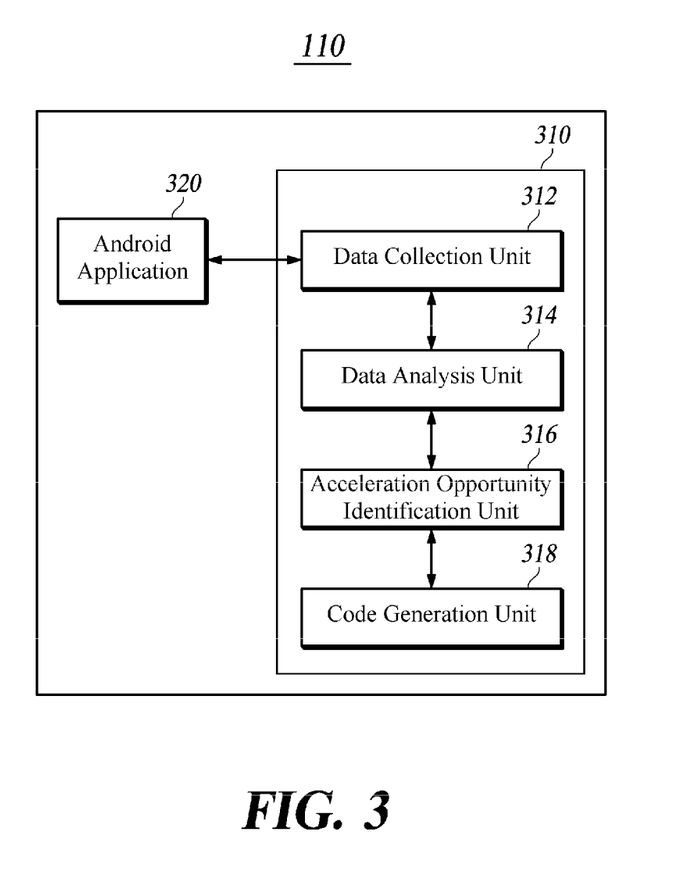
FIG. 3 is a conceptual diagram of an automatic proxy generator, according to at least one embodiment of the present disclosure.

FIG. 3 is a conceptual diagram of an automatic proxy generator, according to at least one embodiment of the present disclosure.

The automatic proxy generator 110 includes a data collection unit 312, a data analysis unit 314, an acceleration opportunity identification unit 316 and a code generation unit 318.

The data collection unit 312 receives mobile application binary information as an input from an external source. The data collection unit 312 transmits the received mobile application binary information to the data analysis unit 314. Herein, the mobile application includes an Android® application.

The data analysis unit 314 analyzes the behaviors of the Android® application 320 with respect to requests and responses generated by executing the received the Android® application 320 from the data collection unit 312. The request and responses analyzed by the data analysis unit 314 represent a command system including 'uniform resource identifier (URI)' information, 'query string' information, 'request method' information, 'header' information and 'body' information generated by the Android® application 320.

Once the data analysis unit 314 receives an Android® application binary information, it performs an automatic and comprehensive analysis of Android® application protocol behaviors.

The data analysis unit 314 generates regex signatures based on the results of the analysis of Android® application protocol behaviors. The data analysis unit 314 transmits the regex signatures to the acceleration opportunity identification unit 316.

The data analysis unit 314 reconstructs hypertext transfer protocol (HTTP) transactions by pairing one request to its corresponding response.

A transaction is an inseparable unit of work. Such inseparable single work activity is called an atomic activity. That is, the transaction includes processes initiated at a user's request to a system and responses by the system to the user.

The data analysis unit 314 infers dependencies between transactions by tracking and identifying from which a field in a request corresponding to a response came, based on one response. Then, the data analysis unit 314 generates analysis results of the dependencies between transactions.

The acceleration opportunity identification unit 316 receives the regex signatures from the data analysis unit 314. The acceleration opportunity identification unit 316 determines acceleration features to be included in the application-specific acceleration proxy based on the received regex signatures.

The acceleration opportunity identification unit 316 receives predetermined information on what and when to prefetch from the data analysis unit 314. The acceleration opportunity identification unit 316 is able to find out what field a previous response comes from. This capability of finding out where a previous response comes from is very useful to prefetch a response with respect to a predetermined request. This is because such response is likely to be requested again by the user.

Moreover, the acceleration opportunity identification unit 316 is able to predict when to perform prefetching by using regex signatures of the previous response. The acceleration opportunity identification unit 316 outputs and transmits identified regex signatures to the code generation unit 318.

The code generation unit 318 generates an application-specific proxy by using the regex signatures received from the acceleration opportunity identification unit 316.

Figure 4:
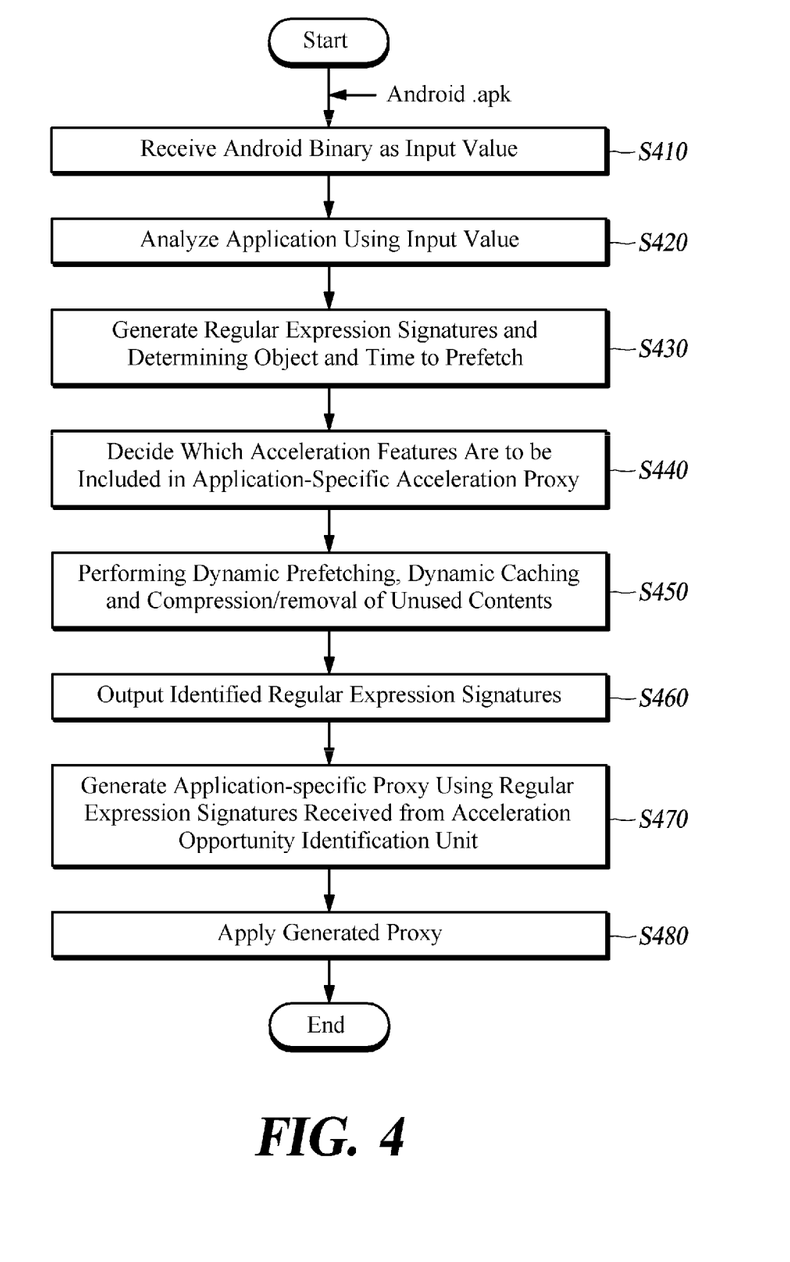
FIG. 4 is a flowchart of a method of automatic proxy generation, according to at least one embodiment of the present disclosure.

FIG. 4 is a flowchart of a method of automatic proxy generation, according to at least one embodiment of the present disclosure.

The flowchart of a method of automatic proxy generation accounts for the first half of the entire method for accelerating loading of a mobile application content illustrated in FIG. 2.

The data collection unit 312 receives Android® application binary information from an Android® application as an input value (Step S410).

The data analysis unit 314 analyzes a command system including 'URI' information, 'query string' information, 'request method' information, 'header' information and 'body' information generated by the Android® application 320 by using the Android® application binary information received from the data collection unit 312 (Step S420).

The data analysis unit 314 generates regex signatures based on the results of Step S420. The data analysis unit 314 determines what and when to prefetch and transmits information on the determination results to the acceleration identification unit 316 of the apparatus 100 for accelerating loading of a mobile application content (Step S430).

The acceleration opportunity identification unit 316 determines acceleration features to be included in the application-specific acceleration proxy, based on the results of Step S430 (Step S440). Herein, the acceleration features may be one or more selected from dynamic prefetching, dynamic caching, compression of unused content and removal of unused content.

The acceleration opportunity identification unit 316 performs at least one among the dynamic prefetching, dynamic caching, compression of unused content and removal of unused content with respect to an order system generated by the Android® application 320 by using the information on the object and time to prefetch received from the data analysis unit 314 (Step S450).

The acceleration opportunity identification unit 316 outputs identified regex signatures based on the results of Step S450 (Step S460).

The code generation unit 318 generates an application-specific proxy 120 by using the regex signatures outputted from the acceleration opportunity identification unit 316 (Step S470).

The apparatus for accelerated loading of mobile application content 100 applies the generated proxy 120 to the Android® application 320 (Step S480).

Figure 5:
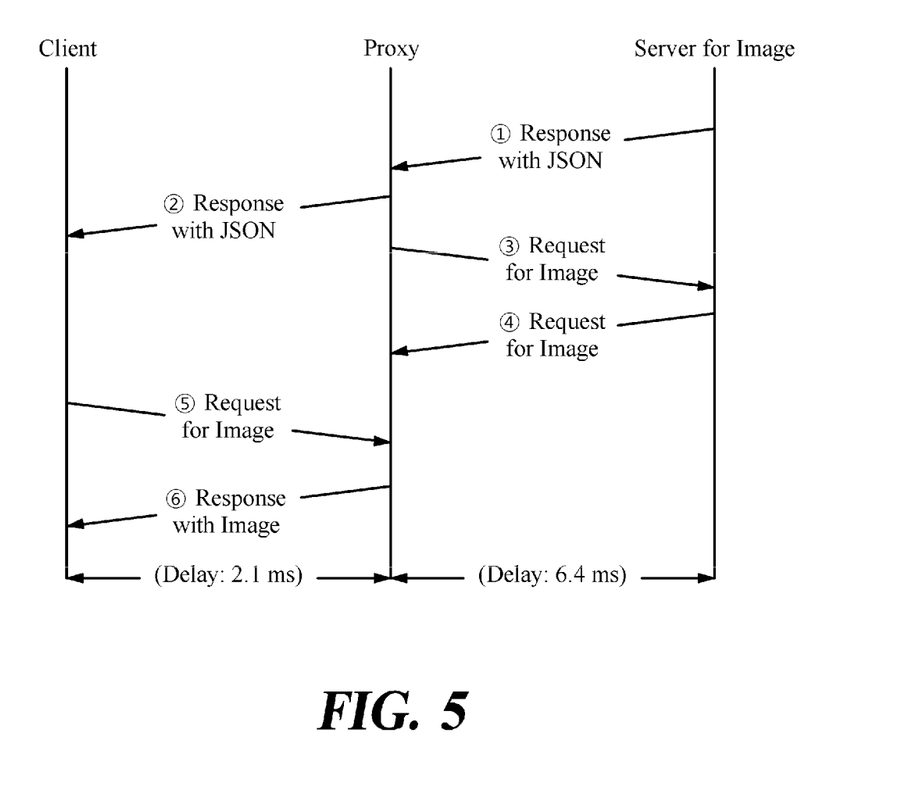
FIG. 5 is a conceptual diagram of a mobile application-specific proxy, according to at least one embodiment of the present disclosure.

FIG. 5 is a conceptual diagram of a mobile application-specific proxy, according to at least one embodiment of the present disclosure.

The mobile application-specific proxy 120 which is automatically generated by the automatic proxy generator 110 according to at least one embodiment of the present disclosure includes a data transmission/reception unit 510, a prefetching unit 520, a data storage unit 530, a prefetching determination unit 540 and a data comparison unit 550.

The data transmission/reception unit 510 functions as an interface between an external source and the proxy 120. The data transmission/reception unit 510 receives a request or a response corresponding to each request from a user or a server, and transmits a request or a response corresponding to each request to the user or the server.

The data comparison unit 550 receives a request from the data transmission/reception unit 510 and checks whether a response corresponding to a request is prefetched or not. Herein, the response is content which is requested by the user. The data comparison unit 550 transmits checked results of whether a response corresponding to the request is prefetched or not. to the prefetching unit 520.

If a response corresponding to the request is found to be prefetched when checked by the data comparison unit 550, the prefetching unit 520 transmits the prefetched response to the data transmission/reception unit 510. If a response corresponding to the request is found to be not prefetched, the prefetching unit 520 transmits the corresponding request to the server and receives a response corresponding to the request from the server. Thereafter, the prefetching unit 520 transmits the response to the data transmission/reception unit 510 and causes the data transmission/reception unit 510 to transmit the response to the user.

Furthermore, prior to performing prefetch, the prefetching unit 520 checks whether a transaction is a parent of any other transaction. In other words, the prefetching unit 520 checks whether a part of data included in the response of the transaction is used to form a request of another transaction.

The prefetching unit 520 uses three different signatures of 'request URI' information, 'request header' information and 'request body' information to identify the number assigned to the corresponding transaction. The prefetching unit 520 checks whether there is a child transaction by using the identified number assigned to a corresponding transaction and 'dependency' information, and transmits the check results to the data storage unit 530.

Furthermore, the prefetching unit 520 performs prefetch when the prefetching unit 520 is ready to perform prefetching.

The data storage unit 530 extracts and stores necessary information from transactions.

If the corresponding transaction is found to be a parent of any other transaction, the data storage unit 530 extracts values used to form a request of the any other transaction among the data included in the response of the corresponding transaction. For example, if 'product_id' information of the body of a response included in a first transaction is used for 'p_id' information of the body of a request included in a second transaction, the data storage unit 530 extracts and stores information corresponding to the 'product_id' information of the body of the response included in the first transaction.

The prefetching determination unit 540 checks whether sufficient information necessary for forming a request using a part of the response included in the corresponding transaction is collected by referring to the data extracted and stored by the data storage unit 530.

For example, let us assume that the information necessary for forming a request included in the second transaction is the 'p_id' information transmitted from a transaction and 'cookie' information transmitted from a third transaction. In this case, the prefetching unit 520 is unable to prefetch a response from a second transaction until a response from the third transaction arrives at the data transmission/reception unit of the proxy 120.

When both the response from the first transaction and the response from the third transaction arrive at the data transmission/reception unit, all data required to form a request of the second transaction are ready. The prefetching unit 520 is allowed to perform prefetching because the prefetching unit 520 can prefetch a response of the second transaction. Herein, to form a request of the second transaction, the 'request URI' information, the 'request header' information, the 'request body' information, the 'p_id' information transmitted in response to the first transaction, and the 'cookie' information transmitted in response to the third transaction are used.

Figure 6:
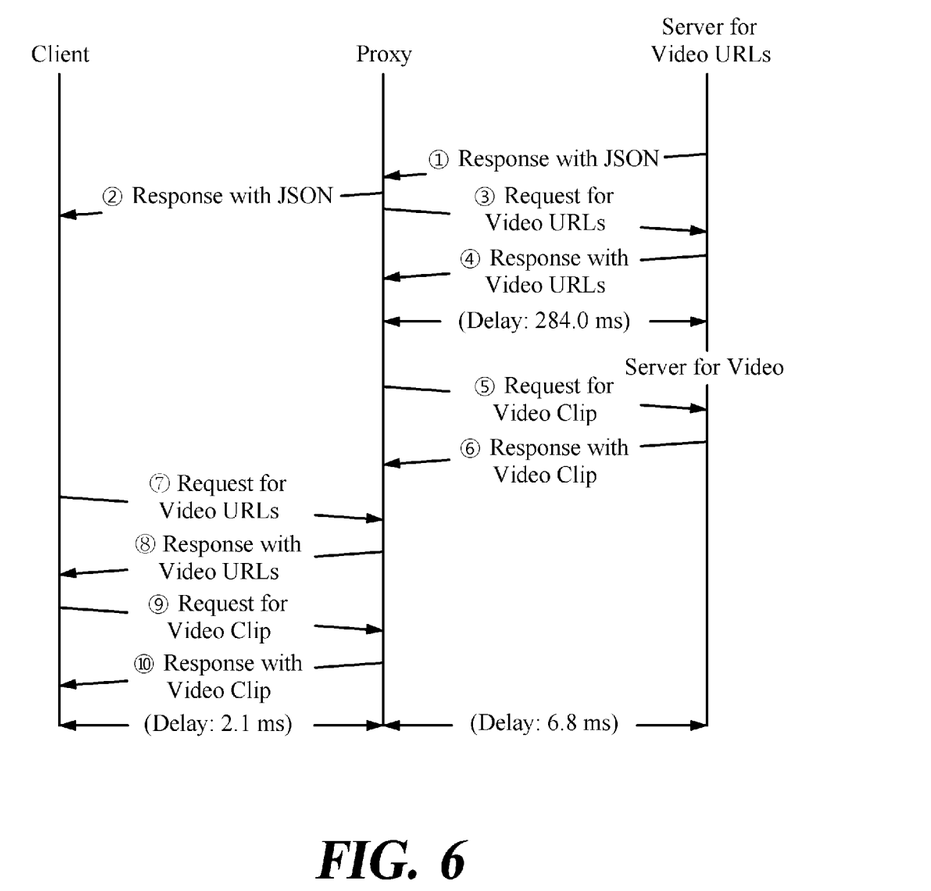
FIG. 6 is a flowchart for describing the operation of a proxy, according to at least one embodiment of the present disclosure.

FIG. 6 is a flowchart to describe the working principle of a proxy, according to at least one embodiment of the present disclosure.

The data transmission/reception unit 510 receives a request from a user (Step S610). The request from a user includes a request for Internet content.

The data comparison unit 550 checks whether a response to the request transmitted from the data transmission/reception unit 510 is prefetched or not (Step S620). If the response to the corresponding request is prefetched, the response is transmitted to the user.

If the response to the corresponding request is not prefetched, the prefetching unit 520 causes the data transmission/reception unit 510 to transmit the corresponding request to the server, and to receive a response corresponding to the corresponding request from the server. The prefetching unit 520 transmits the response to the user.

The prefetching unit 520 checks whether a transaction of Step S630 is a parent of any other transaction (Step S630). In other words, the prefetching unit 520 checks whether a part of the data included in a response of the corresponding transaction is used to form a request of any other transaction. Herein, the prefetching unit 520 uses three different signatures of the 'request URI' information, 'request header' information and 'request body' information to identify the number assigned to the corresponding transaction. The prefetching unit 520 checks whether there is a child transaction by using the identified number assigned to a corresponding transaction and 'dependency' information, and transmits the checked results to the data storage unit 530.

If the corresponding transaction is found to be a parent of any other transaction, the data storage unit 530 extracts information used to form a request of the any other transaction among the data included in the response of the corresponding transaction (Step S650). Herein, the data storage unit 530 stores the request and the response corresponding to the request together.

The prefetching determination unit 540 checks whether all information necessary for forming a request using part of the response included in the corresponding transaction is collected, by checking the extracted and stored data (Step S660).

If the prefetching determination unit 540 determines that sufficient data are found to be collected, the prefetching unit 520 performs prefetching (Step S670).

A proxy was implemented according to the results obtained by the methods above and the validity of the methods were measured. The proxy is based on a mitmproxy (https://mitmprox.org) which allows for interception, modification, inspection and the like. The mitmproxy is able to check raw data of an encrypted flow by setting up secure sockets layer (SSL) connections with respect to clients and servers.

For the measurement of the validity, a British Broadcasting Corporation (BBC) news application which has more than 10 million subscribers on the Google Play store was used as an application under test. The BBC news application has two types of news articles. One is still images and the other is video clips.

The BBC News uses a JavaScript object notation (JSON) response for each article to represent the URLs of its content. Each of the JSON responses includes article information, such as sexual content and image/video clip URLs. The JSON response is delivered to the application upon loading the homepage of the application or upon an access to an adjacent article.

Figure 7:
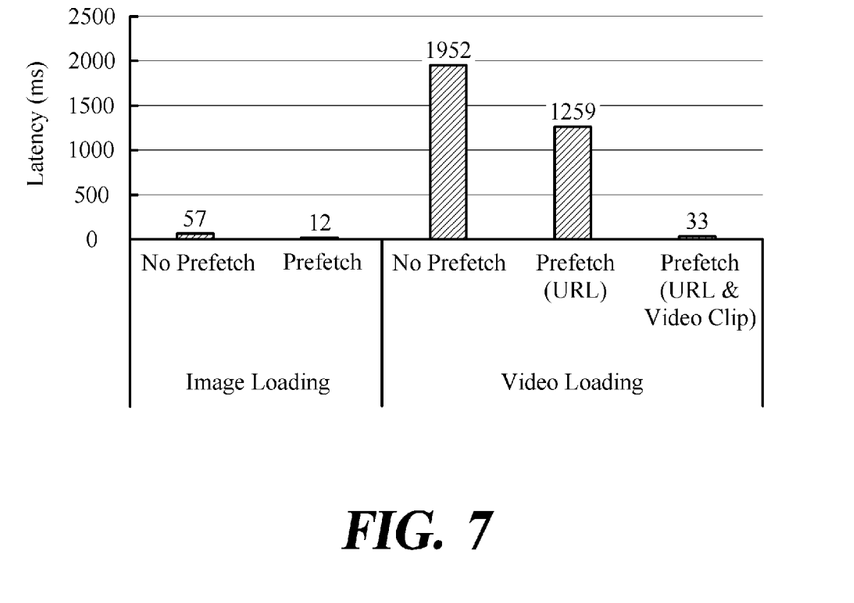
FIG. 7 is a timing chart of an image prefetching method using a proxy, according to at least one embodiment of the present disclosure.

FIG. 7 is a timing chart of an image prefetching method using a proxy, according to at least one embodiment of the present disclosure.

The proxy receives a JSON containing the article information (Step ①). The proxy transmits the JSON to a client (Step ②). The proxy transmits a request message for image prefetching by using the regex signatures provided by the data analysis unit 314 to an image server (Step ③). The image server which received the request message for image prefetching transmits an image to the proxy (Step ④).

A play button for the article is clicked in an environment where the application is active (Step ⑤). The proxy transmits the image to the client on behalf of the image server to reduce a latency (Step ⑥).

Figure 8:
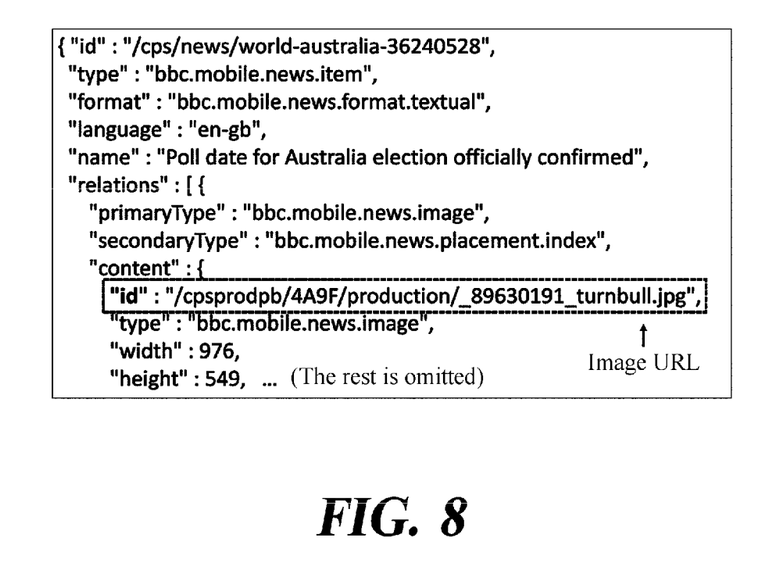
FIG. 8 is a timing chart of a video prefetching method using a proxy, according to at least one embodiment of the present disclosure.

FIG. 8 is a timing chart of a video prefetching method using a proxy, according to at least one embodiment of the present disclosure.

In case of an article containing a video clip, a JSON for the article information contains other JSON's URL containing several video URLs with different bitrates.

Once a play button of a video is touched, the proxy requests for the JSON containing video URLs, and requests for the video clip afterwards.

The proxy receives a JSON response message containing the article information from a video URL server (Step ①). The proxy transmits the JSON to the client as soon as the proxy receives the JSON response message from the video URL server (Step ②). The proxy transmits a JSON message containing ULRs of a video clip to a URL server (Step ③). The URL server transmits a response to the video URL request message to the proxy (Step ④).

The proxy transmits the request for the video clip to a video server (Step ⑤). The video server which received the request for the video clip transmits the video clip to the proxy (Step ⑥).

When the proxy performs prefetching through such steps, and the client requests for the video URL (Step ⑦) the proxy transmits the video URL to the client instead of the server (Step ⑧). The client requests for the video clip by using the received video URL (Step ⑨), and the proxy which received the request transmits the video clip to the client on behalf of the video server (Step ⑩).

A mobile device, e.g., Samsung® SM-N916S was tested for the measurement of latencies when the inventive prefetching method is used.

The proxy may be located inbetween the mobile device and a server handling the mobile service. The proxy is based on mitmproxy 0.17 and operates on Intel i5-4670 platform.

BBC News uses an origin server for fetching image and video URLs, a plurality of image servers for processing and storing images and a plurality of video servers for processing and storing video clips. The image servers and video servers are content delivery network (CDN) servers being located closer to the mobile device than the origin server is.

The latency may be measured by using the methods shown in FIG. 7 and FIG. 8.

Figure 9:
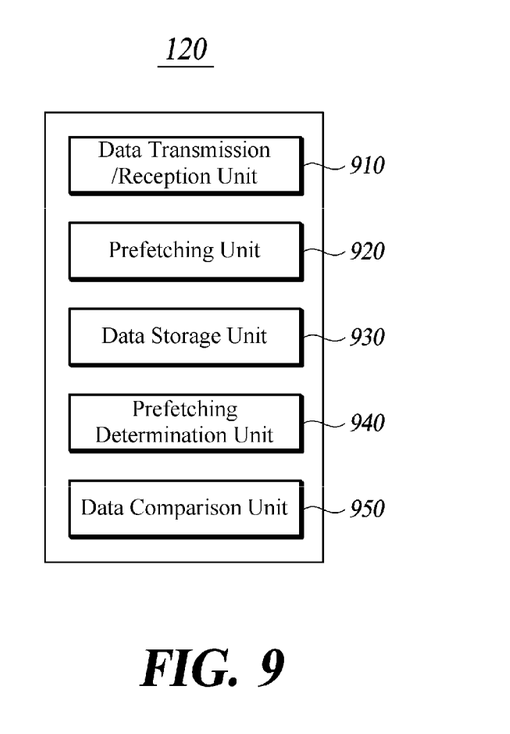
FIG. 9 is a graph diagram of image and video loading times with and without a proxy, according to at least one embodiment of the present disclosure.

FIG. 9 is a graph diagram of image and video loading times with and without a proxy, according to at least one embodiment of the present disclosure.

Latency of loading is calculated by measuring an average latency of 20 runs. The actual latency may be the smallest or greatest value selected among the 20 runs. Herein, it should be noted that the proxy was used even when the proxy did not perform prefetching.

For the calculation of the latency of loading an image, the time of the first byte transmitted at the proxy was measured. It took 57 ms on average for getting an image from the server without prefetching. With prefetching, however, the average latency was reduced to 12 ms. The average data size of the images was 57.4 kB.

The time of the first byte transmitted at the proxy was also measured in case of calculating the latency of loading a video clip. Without prefetching, it took 1952 ms on average to get a video clip. With URL prefetching, that is, with prefetching by using the JSON which contains the video URL, the latency was reduced to 1259 ms. This is because an additional round trip time (RTT), processing latency of HTTP and JSON messages were reduced.

In both the cases, the time for the proxy to receive the first 4 MB chunk of video was measured. Android® MediaPlayer starts playing a video when the first 4 MB of video data arrives.

When the video clip is prefetched, the proxy started to transmit the first byte of video when 33 ms lapses. Assuming the bandwidth of the mobile device is 27 Mbps (average long-term evolution bandwidth in Republic of Korea), the total latency observed by the application to receive the first 4 MB will be approximately 1218 ms.

Figure 10:
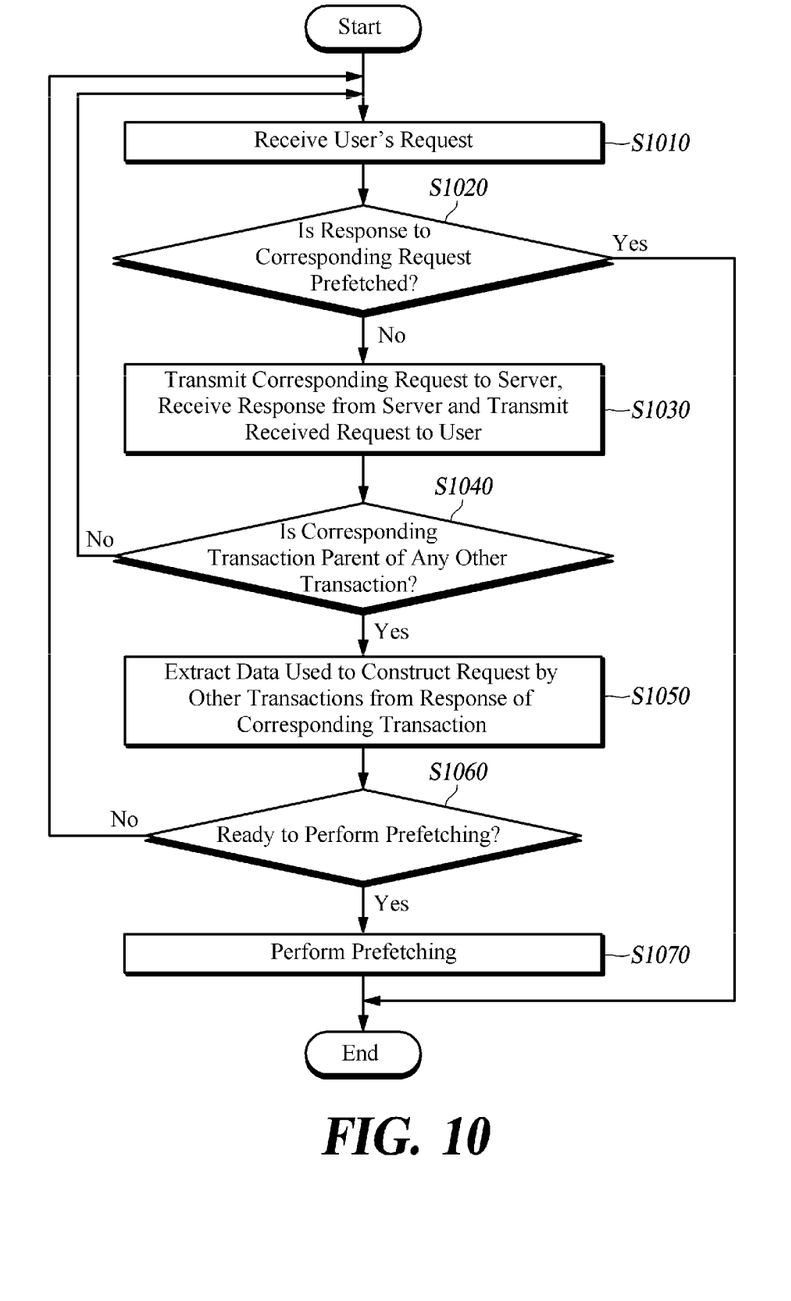
FIG. 10 is a diagram of a portion of a javascript object notation (JSON) containing image article information, according to at least one embodiment of the present disclosure.

FIG. 10 is a diagram of a portion of a JSON containing image article information, according to at least one embodiment of the present disclosure.

Once the client clicks one image article, a corresponding image is requested by using an image URL contained in a JSON. This is the same for video prefetching.

The respective steps in FIGS. 2, 4 and 6 are described to be sequentially performed as mere examples for describing the technical idea of some embodiments, although one of ordinary skill in the pertinent art would appreciate that various modifications, additions and substitutions are possible by performing the sequences shown in FIGS. 2, 4 and 6 in different orders or at least one of the steps in parallel without departing from the idea and scope of the embodiments, and hence the examples shown in FIGS. 2, 4 and 6 are not limited to the chronological order.

The respective steps of the flowcharts illustrated in FIGS. 2, 4 and 6 can be implemented as a computer program, and can be recorded on a computer-readable medium. The computer-readable recording medium includes any type of recording device on which data that can be read by a computer system are recordable. The computer-readable recording medium include, for example, a magnetic storage medium, e.g., a ROM, a floppy disk and a hard disk, an optical data storage medium, e.g., a CD-ROM and a DVD, and a carrier wave, e.g., transmission through the Internet. Further, the computer-readable recording medium can be distributed in computer systems connected via a network, and computer-readable codes can be stored and executed in a distributed mode. Moreover, functional programs, codes, and code segments for implementing some embodiments can be easily deduced by a programmer in technical fields to which some embodiments belong.

According to at least one embodiments of the present disclosure, the loading of a mobile application content can be accelerated by using an automatic protocol analysis which automatically discovers opportunities for application acceleration.

According to at least one embodiments of the present disclosure, an application-specific proxy can be easily generated.

According to at least one embodiments of the preset disclosure, response times for loading of a mobile application content can be remarkably reduced.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity, and those embodiments are not representative of technical limitations of the idea of the present disclosure. Accordingly, one of ordinary skill would understand the scope of the disclosure is not limited by the explicitly described above embodiments but by the claims and equivalents thereof.

What is claimed is:

1. A method for accelerating loading of mobile application content by using a proxy code, the method comprising:
    receiving a mobile application as an input;
    analyzing the mobile application by using the input;
    generating an application-specific proxy dedicated to the mobile application by using results from analyzing the mobile application;
    prefetching content which is likely to correspond to a user's request by using the application-specific proxy; and
    transmitting the content to the user in response to the user's request.

2. The method of claim 1, wherein the analyzing includes extracting at least one of regex signatures including 'request URI' information, 'request body' information, 'request header' information and 'dependency' information generated by the mobile application.

3. The method of claim 1, wherein the prefetching content includes:
    determining at least one selected among dynamic prefetching, dynamic caching, compression of unused content and removal of unused content which are to be included in the application-specific proxy, by using the results from the analyzing the mobile application.

4. The method of claim 1, wherein a dynamic prefetching performs prefetching based on an object and a time to be prefetched.

5. The method of claim 1, wherein the prefetching content includes:

determining whether the prefetched content corresponds to the user's request; and transmitting the prefetched content to the user if the prefetched content is generated, and receiving content corresponding to the user's request from a server and transmitting the content to the user if the prefetching content is not generated.

6. The method of claim 5, further comprising:

checking whether a first transaction which obtains content corresponding to the user's request from the server to transmit the content to the user is a parent of at least one other transaction.

7. The method of claim 6, wherein the checking includes:

identifying a number assigned to the first transaction based on 'request URI' information, 'request header' information and 'request body' information among regex signatures.

8. The method of claim 7, wherein the checking includes:

checking whether a child transaction exists, by using the number assigned to the first transaction and 'dependency' information among the regex signatures.

9. The method of claim 8, processing the user's next request if the first transaction is determined not to be a parent of the at least one other transaction.

10. The method of claim 9, further including:

extracting values used to form a request of the at least one other transaction of responses included in the first transaction if the first transaction is found to be a parent of the at least one other transaction.

11. The method of claim 10, including:

checking whether sufficient information required to form the request of the at least one other transaction is collected.

12. The method according to claim 1, wherein the generating the application-specific proxy further comprises the application-specific proxy dedicated to each application, and wherein the application-specific proxy uses an application-specific protocol which is dedicated to a corresponding application.

13. An apparatus for accelerating loading of mobile application content by using a proxy code, comprising:

at least one memory operable to store a program code;

at least one processor operable to read the program code and operate as instructed by the program code, the program code comprising:

an automatic application-specific proxy generating a code configured to cause the at least one processor to receive a mobile application to analyze the mobile application and to calculate acceleration features for the mobile application; and the proxy code including:

a content prefetching code configured to cause the at least one processor to prefetch content which is likely to correspond to a request signal from a server before the request signal arrives; and a data comparison code configured to cause the at least one processor to compare first content which is prefetched by the content prefetching module with second content corresponding to the request signal if the first content is identical to the second content; and a data transmission/reception unit to transmit the first content to a user terminal.

* * * * *